(12) United States Patent
Burke et al.

(10) Patent No.: US 10,138,023 B2
(45) Date of Patent: Nov. 27, 2018

(54) WIRELESS ENABLED BAGS AND CONTAINERS

(71) Applicant: EMD Millipore Corporation, Burlington, MA (US)

(72) Inventors: Aaron Burke, Hamilton, MA (US); David DeCoste, Chelmsford, MA (US)

(73) Assignee: EMD Millipore Corporation, Burlington, MA (US)

( * ) Notice: Subject to any disclaimer, the term of this patent is extended or adjusted under 35 U.S.C. 154(b) by 0 days.

(21) Appl. No.: 15/860,146

(22) Filed: Jan. 2, 2018

(65) Prior Publication Data

US 2018/0141719 A1    May 24, 2018

Related U.S. Application Data

(60) Division of application No. 14/282,831, filed on May 20, 2014, now Pat. No. 9,889,969, which is a
(Continued)

(51) Int. Cl.
*G06K 19/06* (2006.01)
*B65D 25/20* (2006.01)
(Continued)

(52) U.S. Cl.
CPC ........... *B65D 25/205* (2013.01); *B31D 1/028* (2013.01); *B65D 33/004* (2013.01);
(Continued)

(58) Field of Classification Search
CPC ............... G06K 19/07749; G06K 19/0775
(Continued)

(56) References Cited

U.S. PATENT DOCUMENTS 3,728,694 A    4/1973 Rohrer
5,980,501 A    11/1999 Gray
(Continued)

FOREIGN PATENT DOCUMENTS

EP    1595801 A2    11/2005
EP    2143660 A1    1/2010
(Continued)

OTHER PUBLICATIONS

Extended European Search Report dated Oct. 15, 2009 in corresponding European Patent Application No. EP 09164000.3.
(Continued)

*Primary Examiner* — Daniel St Cyr
(74) *Attorney, Agent, or Firm* — Nields, Lemack & Frame, LLC

(57) ABSTRACT

The present invention provides a process for incorporating a wireless device into a plastic container as part of the steps of manufacturing the container. The plastic container can be a flexible plastic bag and are formed of one or more sheets, generally two or more sheets of plastic film or a rigid plastic container such as a tub or tote. The bags are formed by sealing together adjacent edge portions of each film layer. One embodiment of the present invention is to incorporate a wireless device between the edge portions of the film(s) before or during sealing so that the wireless device becomes permanently sealed into the film material but is isolated from both the bag interior and the outside environment. Another embodiment is to incorporate the wireless device onto or into a plastic component that is sealed to the container, such as a nipple or port, so that the wireless device becomes permanently sealed to the container but is isolated from both the container interior and the outside environment.

6 Claims, 4 Drawing Sheets

Related U.S. Application Data continuation of application No. 12/456,639, filed on Jun. 19, 2009.

(60) Provisional application No. 61/134,169, filed on Jul. 7, 2008.

(51) Int. Cl.

| | | |
|---|---|---|
| *B65D 75/56* | (2006.01) | |
| *B65D 75/58* | (2006.01) | |
| *G06K 7/10* | (2006.01) | |
| *B31D 1/02* | (2006.01) | |
| *B65D 33/00* | (2006.01) | |
| *B31B 50/81* | (2017.01) | |

(52) U.S. Cl.
CPC ....... *B65D 75/566* (2013.01); *B65D 75/5877* (2013.01); *G06K 7/10237* (2013.01); *B31B 50/81* (2017.08); *B65D 2203/10* (2013.01); *Y10T 29/49016* (2015.01); *Y10T 156/10* (2015.01)

(58) Field of Classification Search
USPC .................. 235/492, 451, 462.46, 472.02
See application file for complete search history.

(56) References Cited

U.S. PATENT DOCUMENTS

| | | | |
|---|---|---|---|
| 6,140,139 A | 10/2000 | Lienau et al. | |
| 6,607,097 B2 | 8/2003 | Savage et al. | |
| 6,649,829 B2 | 11/2003 | Garber et al. | |
| 8,405,508 B2 | 3/2013 | Burke | |
| 8,497,775 B2 | 7/2013 | Burke | |
| 8,957,778 B2 * | 2/2015 | Adams | B01L 3/545 235/385 |
| 9,889,969 B2 | 2/2018 | Burke et al. | |
| 2003/0072676 A1 * | 4/2003 | Fletcher-Haynes | A61J 1/10 422/23 |
| 2004/0181938 A1 * | 9/2004 | Suzuki | G05B 19/128 29/832 |
| 2005/0255261 A1 * | 11/2005 | Nomula | B65D 3/22 428/34.2 |
| 2005/0255262 A1 * | 11/2005 | Nomula | B32B 27/08 428/34.2 |
| 2006/0220868 A1 | 10/2006 | Takasawa et al. | |
| 2007/0217717 A1 | 9/2007 | Murray | |
| 2010/0006204 A1 | 1/2010 | Burke et al. | |
| 2010/0201521 A1 | 8/2010 | Adams et al. | |
| 2014/0252084 A1 | 9/2014 | Burke et al. | |

FOREIGN PATENT DOCUMENTS

| | | |
|---|---|---|
| FR | 2862946 A1 | 6/2005 |
| GB | 2433062 A | 6/2007 |
| JP | 2002-157569 A | 5/2002 |
| JP | 2004-284601 A | 10/2004 |
| JP | 2006-8250 A | 1/2006 |
| JP | 2006-27711 A | 2/2006 |
| JP | 2007-308154 A | 11/2007 |
| JP | 2008-537924 A | 10/2008 |
| WO | 96/14043 A1 | 5/1996 |
| WO | 99/19851 A1 | 4/1999 |
| WO | 2006/032326 A1 | 3/2006 |
| WO | 2006/110714 A2 | 10/2006 |
| WO | 2008/061313 A1 | 5/2008 |

OTHER PUBLICATIONS

Extended European Search Report dated Apr. 28, 2011 in corresponding European Patent Application No. EP 11152263.7.
English translation of Japanese communication dated May 7, 2013 in corresponding Japanese Patent Application No. JP 2009-150653.
English translation of Japanese communication dated Jun. 30, 2015 in corresponding Japanese patent application No. 2014-107825.
Office Action dated Sep. 26, 2011 in corresponding U.S. Appl. No. 12/456,639.
Final Rejection dated Jun. 1, 2012 in corresponding U.S. Appl. No. 12/456,639.
Office Action dated Jun. 26, 2013 in corresponding U.S. Appl. No. 12/456,639.
Final Rejection dated Jan. 24, 2014 in corresponding U.S. Appl. No. 12/456,639.

* cited by examiner

WIRELESS ENABLED BAGS AND CONTAINERS

CROSS-REFERENCED TO RELATED APPLICATIONS

This application is a Divisional of U.S. patent application Ser. No. 14/282,831 filed May 20, 2014, which is a Continuation of U.S. patent application Ser. No. 12/456,639 filed Jun. 19, 2009, which claims the benefit of U.S. Provisional Patent Application No. 61/134,169, filed on Jul. 7, 2008, the entire contents of which are incorporated by reference herein.

The present invention relates to a process and device for incorporating wireless enabled devices permanently into disposable bags and containers. More particularly, it relates to the incorporation of a wireless device, such as a RFID tag, into the structure of the bag or container or a component of the bag or container that is permanently attached to the bag or container.

BACKGROUND OF THE INVENTION

The use of identification and preferably active or interactive identification devices is becoming a popular item for several businesses. These range from simply bar codes to three dimensional bar codes to more recently wireless devices such as read only or read-write RFID chips (active or interactive systems).

In many products, the wireless device is simply attached to the carton in which it is shipped and is useful only during storage and transport.

More recently, the wireless devices have begun to be attached to the product itself so that it can be enquired any time during its life.

On plastic parts such as tubing and filters, various methods have been suggested for attaching such a tag. These include molding the tag onto a collar on the tubing or to mold the tag as part of the tubing or filter housing. In other applications, the use of an adhesive patch or pouch to bond the tag to the product has been suggested. The use of a spiral wrap of tape to contain the tag has also been suggested. Lastly, the use of straps or "dog tags" containing the tag that are then attached to the device has been suggested.

Many of these approaches such as molding as part of the formation of the plastic material will not work for plastic films used to make bags and containers. The film manufacturing process is difficult and the placement of the tag in the film as it is being made is near impossible. Additionally as films are used to make different sized bags, the placement of the tags would have to be far enough apart to accomplish this while providing a tag for each container. This leads to waste of plastic or of the tags themselves in making the different sized bags.

Other means such as the pouch, strap or dog tags all occur as a separate step and there is the risk that they may be forgotten. Additionally, they are an additional processing step and require the use for an additional element (pouch or patch, strap or dog tag).

What is needed is a process for incorporating the tag as part of the manufacture process of the container and a device having such a tag feature.

SUMMARY OF THE INVENTION

The present invention provides a process for incorporating a wireless device into a plastic container (be it a bag or rigid plastic container) as part of the steps of manufacturing the container.

Most plastic containers are bags and are formed of one or more sheets, generally two or more sheets of plastic film. The bags are formed by sealing together adjacent edge portions of each film layer(s). One embodiment of the present invention is to incorporate a wireless device between the edge portions of the film(s) before sealing so that the device becomes permanently sealed into the film but is isolated from both the bag interior and the outside environment. The wireless device may be adhered to a film surface if desired.

Another embodiment is to incorporate the wireless device into a plastic component that is sealed to the container, such as a nipple or port, so that the device becomes permanently sealed onto or into the plastic component's material but is isolated from both the bag interior and the outside environment. The wireless device may be adhered to a surface of the plastic component, overmolded onto the plastic component or molded into the component during its manufacture.

In either embodiment, the wireless device is incorporated as a standard step of manufacturing and no additional step in making the bag is required in order to incorporate the device into the bag.

Optionally, the wireless device is formed of materials that allow it to be gamma compatible, thereby allowing the assembled container to be gamma irradiated for sterility.

The wireless device can be either a read only device, telling the user only that information which has been loaded on to it by the manufacturer, or preferably it is a read/write device allowing the user to add additional trackable events such as date of use, contents added to the container, etc.

In one preferred embodiment the wireless device is always placed in the same relative location from container to container for ease of use by the user. For example by having the wireless device in the same spot, one could attach a reader in a location such as on ancillary equipment or container holders that allows for the automatic interrogation of the device each time a new container is used.

It is an object of the present invention to provide a process for incorporating a wireless device permanently into a disposable container comprising the steps of selecting a wireless device having a memory, an antenna and a communications component, the wireless device being formed as a single entity, providing plastic components for making a container and incorporating the wireless device into the components such that the wireless device is permanently sealed into the container as it is formed.

It is an object of the present invention to provide a process for incorporating a wireless device permanently into a disposable container comprising the steps of selecting a wireless device having a memory, an antenna and a communications component, the wireless device being formed as a single entity, providing plastic components for making a container wherein the plastic components are at least two films of plastic having corresponding and matable edges that are capable of being fluid tightly sealed to each other and the wireless device is placed between the matable edges and retained there before or during the sealing of the matable edges to each other such that the wireless device is permanently sealed into the container as it is formed.

It is an object of the present invention to provide a process for incorporating a wireless device permanently into a disposable container comprising the steps of selecting a wireless device having a memory, an antenna and a communications component, the wireless device being formed as a single entity, providing a plastic component to be mated and sealed to the container, incorporating the wireless device into the plastic component, attaching and sealing the plastic component containing the wireless device to the container in a desired location such that the wireless device is permanently sealed to the container.

DESCRIPTION OF SPECIFIC EMBODIMENTS

Figure 1:
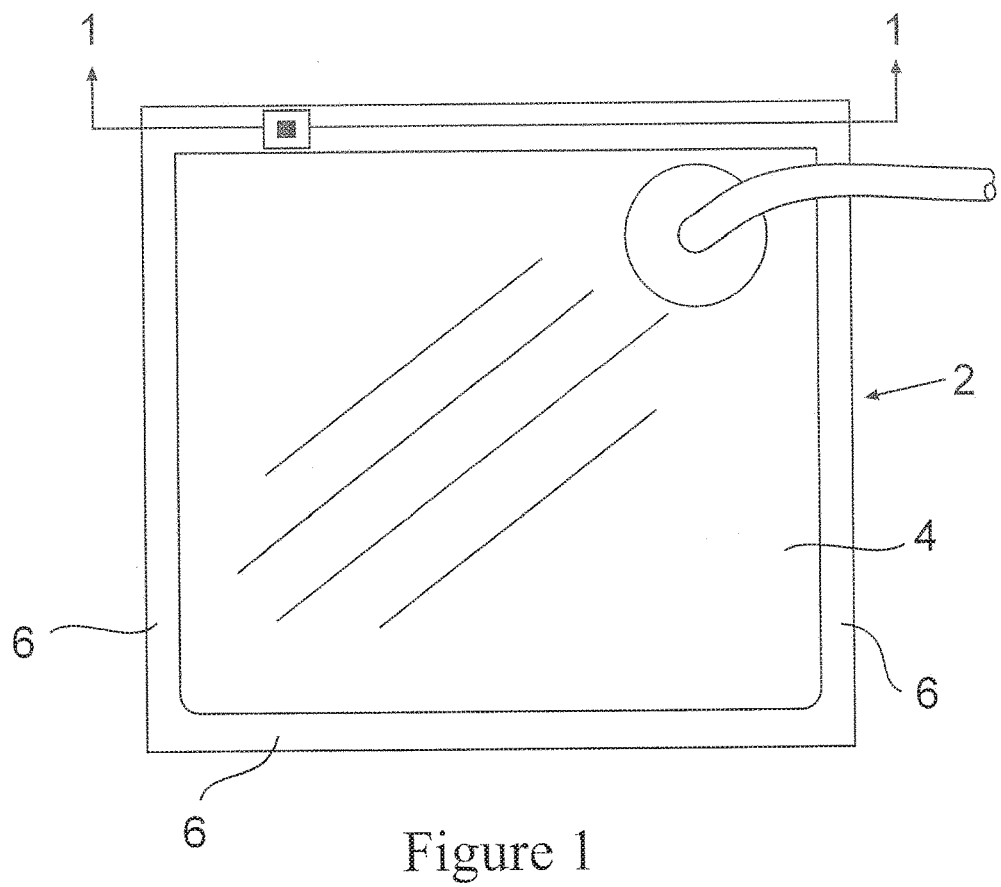
FIG. 1 is a planar view of a bag according to the first embodiment of the invention.

FIG. 1 shows a disposable container 2, in this embodiment a plastic flexible container or bag, formed of one or pieces of film 4 having open, adjacent edges 6 which are fluid tightly sealed together to form a closed container 2. In the embodiment shown, two pieces of film 4 are used and are in the form of sheets of similar sizes. The two sheets of film 4 are placed adjacent each other, preferably directly touching each other at least along the respective edges 6 to be sealed.

A wireless device 8 is placed between the edges to be sealed and then the edges are fluid tightly sealed together trapping the wireless device between them. The device 8 may contain information such as date of manufacture, container manufacturer, container type, catalog number, serial number etc. This may either be loaded onto the device 8 before it is inserted between the edges 6 to be sealed or after it is sealed in place. If desired the device may have an adhesive or adhesive pad attached to at least one surface for temporarily securing the device to the film during the sealing of the film. In this way, the device is not lost or moved during assembly.

Figure 2:
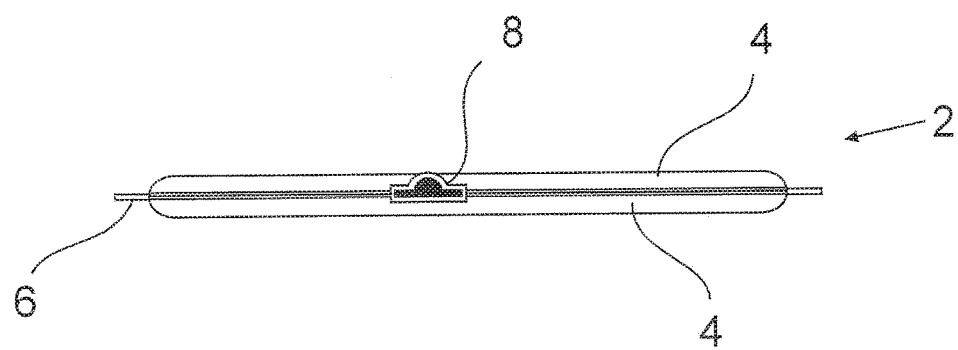
FIG. 2 is a cross sectional view of the embodiment of FIG. 1.

FIG. 2 shows a cross-sectional view of the embodiment of FIG. 1. As can be seen the device 8 is contained between the two edges 6 of the film 4 so that the device 8 is permanently sealed into the container 2 but is isolated from both the container interior and the outside environment. This allows the device to be used and yet not be in contact with the contents of the container in case there may be adverse effect to either the contents or the wireless device by such contact. Additionally, the device is permanently affixed to the container and remains with it throughout its life so that data is never lost or compromised. Likewise by isolating it from the outside environment it is protected from dust, liquids and other effects that might otherwise compromise its integrity.

Figure 3:
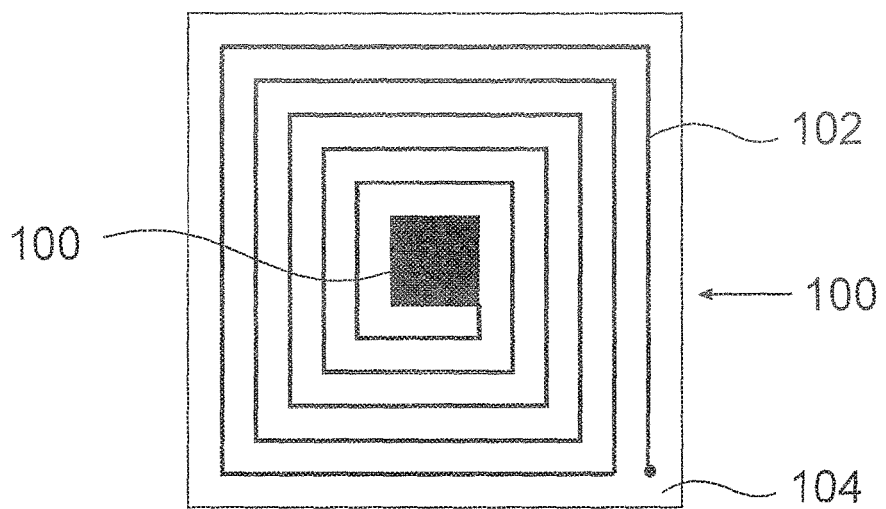
FIG. 3 shows a typical wireless device useful in the present invention in planar view.

The wireless device essentially comprises two components as shown in FIG. 3, a microchip or other memory type of device 100 and an antenna 102. These are generally attached to a plastic surface or sheet 104 or encapsulated with an epoxy (not shown). The antenna can be a cut or punched metal array, a screen printed design or any other type of antenna common to these devices. The device can be of any frequency although high frequency (HF) and ultra-high frequency (UHF) are the most popular. Additional elements may be added if desired such as a battery or capacitor to provide the device with its own power source (not shown). Most systems however are passive and rely on the signal from the reader/writer to power up the device as needed. Such passive circuits have been constructed from thermally stable materials such as Tagsys SDM RFID tags or Datalogic RFID tags made with polyimide support film (see WO1999019851 A1). These tags are designed and have been shown to survive thermal molding processes compatible with thermal container assembly techniques.

In many applications, the containers are sterilized and remain sterile at least until use. These containers are often irradiated with beta or gamma radiation to render them sterile. Unfortunately for the large majority of wireless devices the memory and other components are not radiation compatible as they use a stored charge to represent the value of each binary bit of data. Such devices are highly susceptible to corruption caused by the radiation. Often the charge is depleted or enhanced by the radiation, thereby affecting its value and the data that may be contained within it. Such devices include but not limited to Flash memory such as EEPROM, DRAM and SRAM.

There are other memory technologies that use mechanisms other than charge storage to retain data and values of a bit. For example, FRAM or ferro-magnetic RAMs, utilize molecules having a bi-stable structure to store state, wherein the one of the stable molecular configurations represents a high or '1' and the other represents a low or '0'. Several common molecules in a FRAM are PZT (lead-zirconate-titanate), SBT (Strontium-bismuth-tantalate) and BLT (lanthanum-substituted bismuth-tantalate). Each possesses a central atom in a cubic unit cell having a dipole moment. The molecules switch between these two stable states based on the application of an electric field to the molecule. Since these cells rely on electrical fields, rather than storage charge, memories utilizing this mechanism are far less susceptible to gamma and other types of radiation than traditional semiconductor memory structures and are described in U.S. Pat. No. 3,728,694.

Another example of a memory device that does not utilize charge as the storage mechanism is MRAM, also known as magnetoresistive or simply magnetic RAM. These devices use ferromagnetic materials often in the form of Hall sensors to store the state of the bit. See U.S. Pat. No. 6,140,139. Since the magnetic fields are utilized instead of the capacitive charge these devices are also less susceptible to radiation especially gamma radiation.

Any other device that uses a system that is not susceptible to radiation may also be used in such embodiments.

The wireless device(s) 8 can be any such device such as a RFID tag, a Zigbee® device, a Bluetooth® device and the like as is known to the art.

By "fluid tightly", it means the container seals are liquid tightly sealed and are sealed to an extent that air or gas is not detected as leaking through the film seal area. Of course depending upon the film material selected some gas may eventually transfer interstically either from inside the container to the environment or from the environment into the container and the term is meant to allow for that happen if the film selected is not highly gas impervious. The use of gas impervious plastics such as EVOH can reduce or eliminate this transport of gas across the container wall and it is meant by the term to cover that aspect as well.

Figure 4:
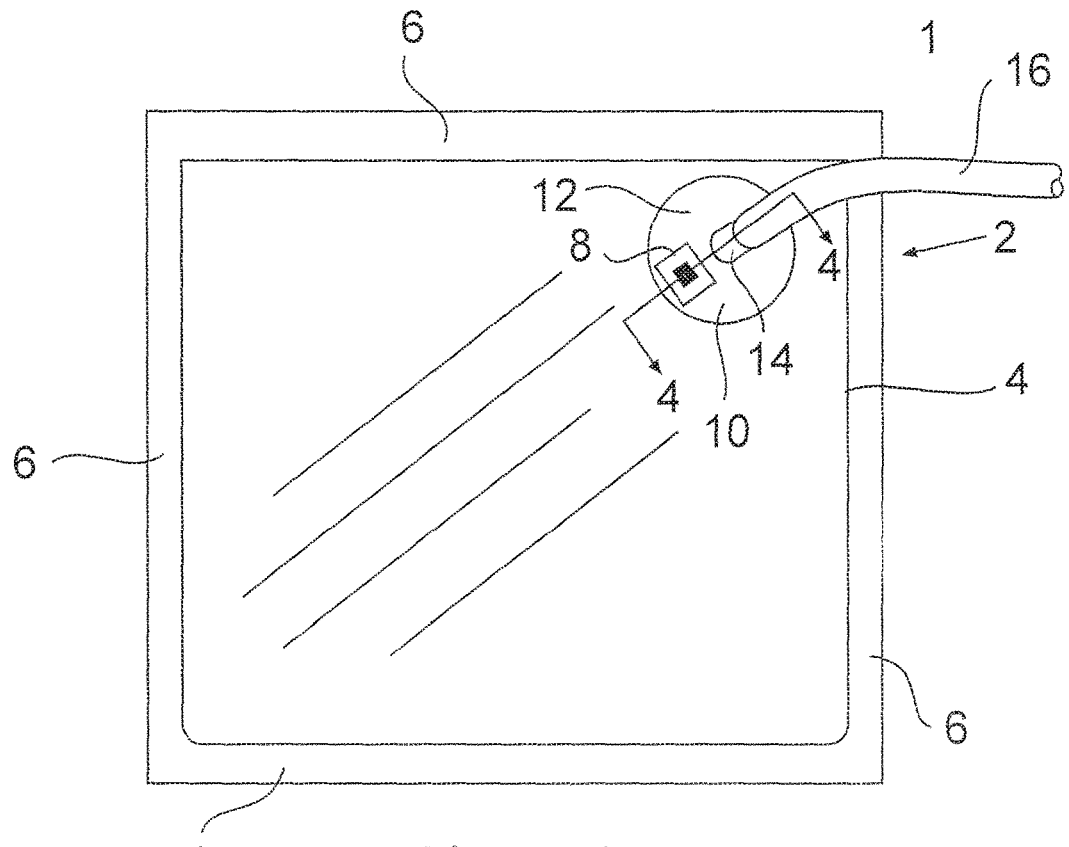
FIG. 4 is a planar view of a bag according to the second embodiment of the invention.

FIG. 4 shows a second embodiment of the present invention. Such containers (be they bags or rigid containers) need one or more plastic components 10 such as ports, tubing nipples, hanging eyelets, alignment plates and the like molded or sealed to them to allow for other functions such as the entry and exit of various components such as product to be stored, worked on, etc, processing liquids such as water, cell culture media if a bioreactor bag, gases such as oxygen, carbon dioxide, nitrogen, etc and the like or to provide means for hanging or aligning the container in a desired arrangement. These plastic components such as the ports 10 (as shown) are generally formed of a flange portion 12 that is sealed to the container 2. In the case of a port 10 the flange portion 12 is around an opening 18 (FIG. 5) in the container wall. In this embodiment, a stem 14 extends away from the flange portion of the port 10 and as shown is attached to a tube 16 or other such element. Other elements can include but are not limited to filters, sterile connectors and the like. Alternatively, the plastic component may be a grommet or rivet-like structure having two essentially similar pieces that are sealed together or it may only have one plastic portion that attaches to the surface.

Figure 5:
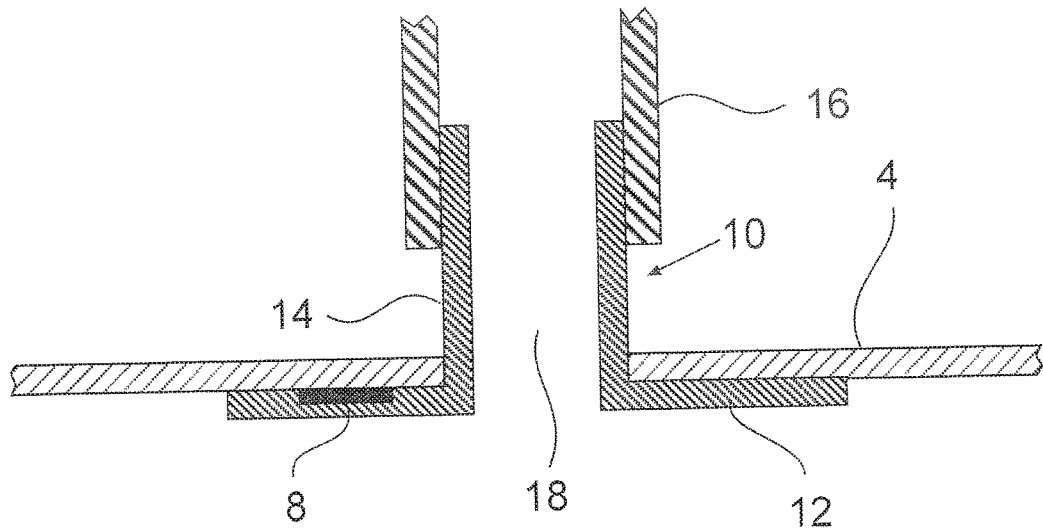
FIG. 5 is a cross sectional view of the embodiment of FIG. 4.

A wireless device 8 is attached to a portion of the plastic component 10. As shown in FIGS. 4 and 5 the device 8 is attached to the flange portion 12 of the plastic component 10. This may be by being molded into the flange portion or by heat sealing it to a portion of the port or by adhering it to the desired portion of the port as desired. Preferably, it is molded into a portion of the port itself so as to isolate it from the contents of the container and protect it from the environment and accidental damage during storage, shipping or use. Alternatively, it may be located on a portion of the port where it is isolated from the container contents simply by its location. Such positions include but are not limited to the interface between the flange 12 and the inner surface of the container 2 to which the flange 12 is attached and the outer surface of the stem 14 (preferably in the area covered by the tube 16 to further isolate and protect it from the environment.

Figure 6:
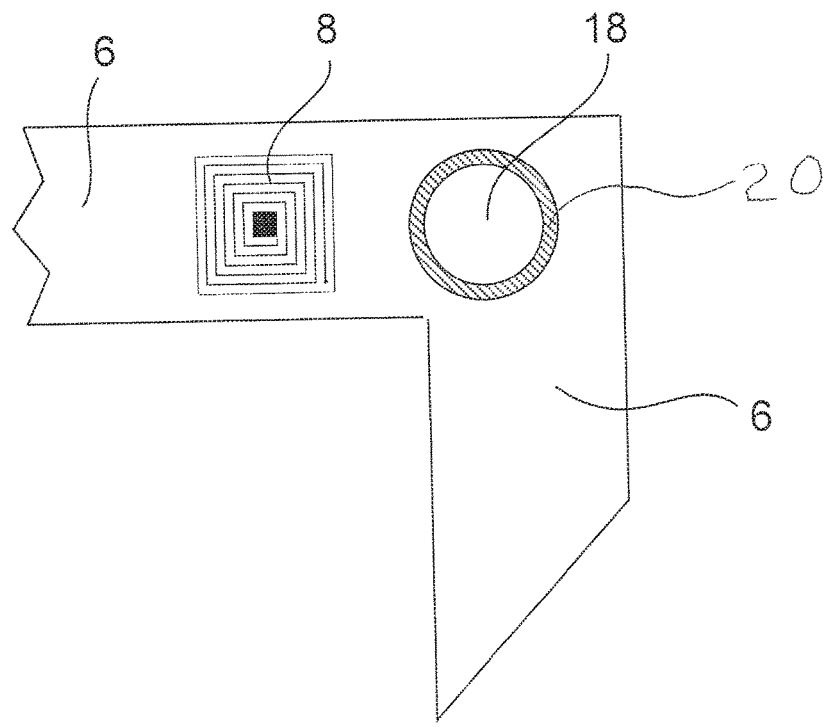
FIG. 6 is close-up planar view of a corner of a container according to one embodiment of the present invention.

It is desirable in some applications to have the wireless device mounted in the same relative location from container to container so that a user does not need to search for the device. Additionally, this is particularly useful in applications where the scanner is mounted on an ancillary piece of equipment. In one embodiment, it is mounted to the inlet port of the container. In another, it is located at the left, right or center of the uppermost seam. Some containers use eyelets 20 and other devices to hold them upright or to align them during installation or use (FIG. 6). Such structures are another good location for the wireless devices 8 as they also can help orient the container to the user ensuring it always goes in the correct way and in the proper alignment. In a further embodiment, the wireless device may be highly colored or the plastic component to which it is attached is highly colored (not shown) so that it is easily found. Other similar locations may also be used.

The disposable container of this invention is formed of a polymeric composition such as polyethylene, including ultrahigh molecular weight polyethylene, linear low density polyethylene, low density or medium density polyethylene; polypropylene; ethylene vinyl acetate (EVOH); polyvinyl chloride (PVC); polyvinyl acetate (PVA); ethylene vinyl acetate copolymers (EVA copolymers); blends of various thermoplastics; coextrusions of different thermoplastics; multilayered laminates of different thermoplastics; or the like (by different it is meant to include different polymer types such as polyethylene layers with one or more layers of EVOH as well as the same polymer type but of different characteristics such as molecule weight, linear or branched polymer or fillers and the like). Typically medical grade and preferably animal-free plastics are used. The container maybe a flexible plastic container such as a bag or a rigid plastic container such as a bin, box, tote, barrel and the like. They may be sterilized such as by steam, ethylene oxide or radiation, such as beta or gamma radiation. Most have good tensile strength, low gas transfer and are either transparent or at least translucent.

In use, the wireless devices 8 are read by a scanner (not shown) which may be a fixed station such as a desktop reader like the AccuSmart™ reader available from Millipore Corporation of Billerica, Mass. or a scanner mounted to either a holder for the container, such as bin or tote, if used, or an ancillary piece of equipment such as a pump or the like (not shown), or a hand held device such as the Hose Tracker™ reader available from Advantapure of South Hamilton, Pa.

The wireless device may be a read only device so that it contains only information loaded by the manufacturer at its facility. In use, the wireless device 8 arrives at a user's facility with manufacturer name, container type or use restrictions and sterilization data, etc. already loaded on to it or contained on a secure website of the manufacturer which can be accessed by providing the website with the identification number contained on the wireless device. Also with read only wireless devices one can use a computer, local or wide area network or internet site to track what happens to the container in the hands of the user by listing one or more trackable events (type of use, date of use, contents, etc) on the computer, network or internet site using the identity code assigned to the wireless device.

Preferably, the device 8 is a read/write device capable of adding additional information by the user. This information may be an identity (unique user code or specific user use) or location of the bag or optionally, at least one trackable event such as its date of installation, installer, contents, etc. This information may be entered by the scanner and also read by the scanner. The information may be stored on the wireless device itself and it may be downloaded to a computer or network connection or the internet if desired.

The device 8 may be a passive device being active only when being scanned or interrogated by the reader. Alternatively, it may be an active device and either contain a battery for power or be coupled such as by a magnetic inductive system to a power source.

For storage applications, the device 8 or the computer network or internet site may contain specific storage instructions such as temperature to be maintained at, length for storage and the like.

Figure 7:
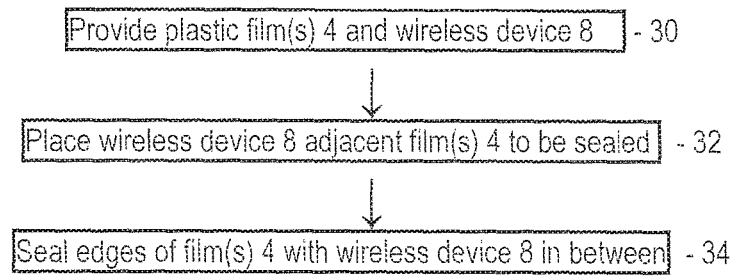
FIG. 7 is a flow diagram illustrating a first preferred embodiment of the process of this invention.

To make a product containing a wireless device as claimed in this invention, for a plastic bag, one takes one or more pieces of plastic film, preferably two or more pieces, as shown as step 30 in FIG. 7, places the wireless device on a portion of the film(s) to be sealed as in step 32 and seals the desired edges of the film(s) together such as by heat sealing or glue or adhesives, or sonic vibration, as in step 34.

Figure 8A:
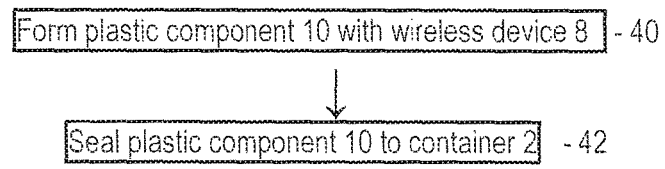
FIGS. 8A and B are flow diagrams illustrating additional preferred embodiments of the process of this invention.
Figure 8B:
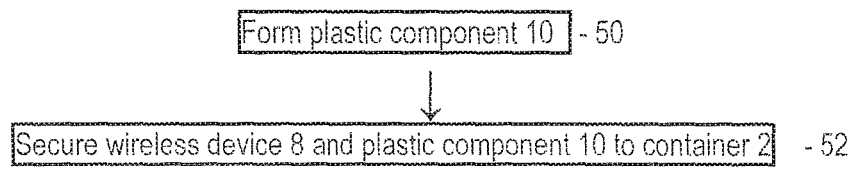

In incorporating the wireless device to a plastic component 10, such as a port one follows the procedure of FIG. 8A or FIG. 8B.

In FIG. 8A the wireless device is incorporated into the plastic component in step 40. This may be done such as by molding the device 8 into the component as it is made. In step 42 the component containing the wireless device 8 is then sealed to the container 2.

In FIG. 8B, the component is made and then the wireless device is associated with it. This can be done by overmolding the device to the component or by adhering it to the component. Alternatively, the device can be placed on the container surface and covered by the component as it is sealed to the container.

A system according to any of the embodiments allows one to electronically collect and/or store one or more trackable events such as data relating to the container, its installation, use and if done, testing results.

The wireless device enabled system of the present invention eliminates any error as to location, date, time, user and the like and allows one to use good manufacturing practices (GMP) and good laboratory practices (GLP) in sampling systems.

EXAMPLE 1

A wireless device, in this example a RFID tag formed of read/write chip and an antenna, available from Tagsys S.A. of France as catalog item Ario™ SM-ISO RFID tag was selected for this example. The wireless device had dimensions of 14 mm wide by 14 mm long and 2 mm high.

Two sheets of a polyethylene based plastic film (Pureflex™ film available from Millipore Corporation) were selected.

The wireless device was tested before insertion between the sheets by reading the device with a handheld reader available from Tagsys.

The device was centered between the two sheets and the edges of the sheets around the device were heated sealed using a hot iron at 180° C. with hand pressure to simulate a seam in a biobag.

The sheets were allowed to cool and the wireless device was then tested and found to be capable of both reading and writing information.

EXAMPLE 2

A wireless device, in this example a RFID tag formed of read/write chip and an antenna, available from Tagsys S.A. of France as catalog item Ario™ SM-ISO RFID tag was selected for this example. The wireless device had dimensions of 14 mm wide by 14 mm long and 2 mm high.

The wireless device was tested before insertion into the housing by reading the device with a handheld reader available from Tagsys.

A circular piece of polypropylene was injection molded to encapsulate the wireless device within the polypropylene.

An outer surface of the piece was placed against a polyethylene based film (Pureflex™ film from Millipore Corporation) and bonded to the outer surface of the film by heating the film and circular piece with standard vibration thermal welder at about 200° C. for a period of approximately 1 minute while applying pressure between the two. The vibration was then stopped, the film and piece allowed to cool and the wireless device was then tested and found to be capable of both reading and writing information.

The invention claimed is:

1. A process for incorporating a wireless device permanently into a disposable plastic container comprising:
   selecting a read/write wireless device capable of having data written to the read/write wireless device including a memory, an antenna and a communications component;
   providing a plastic component to be mated and permanently sealed to said container, the plastic component performing a function for the container, facilitating entry and/or exit of components or providing means for hanging or aligning the container in a desired arrangement;
   disposing said wireless device between said plastic component and said container; and
   attaching and permanently sealing said plastic component to said container such that said plastic component covers said wireless device, such that said plastic component is permanently sealed to said container, and said wireless device is sealed between said plastic component and said container and is isolated from both interior and exterior environments of said container.

2. The process of claim 1 wherein said plastic component is selected from the group consisting of ports, tubing nipples, hanging eyelets, grommets, and alignment plates.

3. The process of claim 1 wherein said plastic component is a port having a flange portion surrounding an opening in said container.

4. The process of claim 1, wherein said wireless device is formed of materials that allow it to be beta and gamma radiation compatible.

5. The process of claim 1, wherein said wireless device is heat sealed to said plastic component prior to said attaching and permanently sealing.

6. A process for incorporating a wireless device permanently into a disposable plastic container comprising:
   selecting a read/write wireless device capable of having data written to it including a memory, an antenna and a communications component;
   providing a plastic port, having a flange portion, to be mated and permanently sealed to said container, the plastic port facilitating entry and/or exit of components;
   disposing said wireless device between said flange portion and said container; and
   attaching and permanently sealing said plastic port to said container such that said flange portion surrounds an opening in said container and covers said wireless device, such that said plastic port is permanently sealed to said container, and said wireless device is sealed between said flange portion and said container and is isolated from both interior and exterior environments of said container.

* * * * *